United States Patent
Johnson et al.

(10) Patent No.: US 7,649,326 B2
(45) Date of Patent: Jan. 19, 2010

(54) HIGHLY EFFICIENT SERIES STRING LED DRIVER WITH INDIVIDUAL LED CONTROL

(75) Inventors: Brant Ture Johnson, Concord, MA (US); James Henry Aliberti, North Attleboro, MA (US)

(73) Assignee: Texas Instruments Incorporated, Dallas, TX (US)

( * ) Notice: Subject to any disclaimer, the term of this patent is extended or adjusted under 35 U.S.C. 154(b) by 301 days.

(21) Appl. No.: 11/691,687

(22) Filed: Mar. 27, 2007

(65) Prior Publication Data

US 2007/0257623 A1    Nov. 8, 2007

Related U.S. Application Data

(60) Provisional application No. 60/743,804, filed on Mar. 27, 2006.

(51) Int. Cl.
*H05B 37/00* (2006.01)
(52) U.S. Cl. .................. 315/291; 315/185 R; 315/192; 315/193
(58) Field of Classification Search ................. 315/291, 315/307, 185 R, 192, 193
See application file for complete search history.

(56) References Cited

U.S. PATENT DOCUMENTS

| 7,317,403 B2* | 1/2008 | Grootes et al. ......... 340/815.45 |
| 2007/0069664 A1* | 3/2007 | Robinson et al. ............ 315/312 |

* cited by examiner

*Primary Examiner*—David Hung Vu
(74) *Attorney, Agent, or Firm*—John J. Patti; Wade J. Brady, III; Frederick J. Telecky, Jr.

(57) ABSTRACT

A current source generates, with high efficiency, a current that is substantially constant over a wide range of output voltages. This current is injected into the first end of a series-connected string of LEDs, with the second end of the string connected through a resistor to ground. The voltage developed across this resistor, which is a measure of current flow in the series string, is fed back to the current source, wherein feedback maintains nearly constant current output over a wide range of output voltages. A field effect transistor (FET) is placed in parallel with each LED in the string. A level shift gate driver couples a pulse width modulated control signal to the gate of each FET. With the FET being coupled across a particular LED, the LED can be bypassed when the FET is actuated or receive current when the FET is deactuated. By modulating the duty cycle of each FET, the brightness of each associated LED may be varied smoothly over its full range.

10 Claims, 4 Drawing Sheets

HIGHLY EFFICIENT SERIES STRING LED DRIVER WITH INDIVIDUAL LED CONTROL

CROSS-REFERENCE TO RELATED APPLICATIONS

This application claims priority, under 35 U.S.C. §119(e)(1), of U.S. Provisional Application No. 60/743,804, entitled "HIGHLY EFFICIENT SERIES STRING LED DRIVER WITH INDIVIDUAL LED CONTROL," having as its inventors Brant Johnson and James H. Alberti, filed Mar. 27, 2006, and hereby incorporated herein by this reference.

BACKGROUND OF THE INVENTION

1. Field of the Invention

This invention relates generally to driving light emitting diodes (LEDs), and more specifically to efficient duty cycle control of multiple LEDs in a series connected string of such LEDs, so as to control brightness of individual LEDs and color mixture of groups of LEDs.

2. Description of the Related Art

LEDs are widely used in lighting and display applications due to their high efficiency, long life, ruggedness and compact size. Early LEDs emitted red light, and found usage in calculator and watch displays. The availability of green, yellow and orange LEDs widened the usage of LEDs, but it was the development of blue and white light LEDs which led to widespread usage in backlight, flashlight, architectural and automotive applications. As LED power and efficiency increases, they are finding increased usage in architectural and general indoor and outdoor lighting applications.

One type of white LED uses a blue or ultraviolet emitting die with a phosphor deposited on or in proximity to the die. The mix of direct light from the die and light emitted by the excited phosphor blends to generate the color of such LEDs. Such white LEDs have the advantage of a single die with simple current drive requirements, but the color temperature and subjective quality of the white light so generated may not be optimum for the intended use.

Another way of generating a wide range of colors using LEDs is to mix the primary colors red, green and blue emitted from individual red emitting, green emitting, and blue emitting die or packaged LEDs. By controlling the relative current in each LED, and hence the relative brightness of each, a wide range of colors of varying brightness may be generated. Because the LED die or packaged LEDs are compact, a triad of red, green, and blue LEDs may be made small enough to be used as a single pixel in an array of pixels in a large display. Such LED array displays have found wide usage in applications requiring high brightness, such as stadium displays and signs along roadways.

In such an array application, a large number of LEDs are controlled by drivers to modulate the intensity of each LED. For example, to provide medium quality resolution, an array having 320 by 240 pixels may be used, each pixel having a red, green and blue LED, for a total of about 230,000 LEDs and drivers. In some applications, time division multiplexing techniques may be used to reduce the number of drivers. For example, a single row of pixels at a time may be turned on, sequentially addressing each row much like television scan lines. However, such time division multiplexing decreases overall brightness, so is not usable in all applications.

A large array of diodes and their drivers dissipates a considerable amount of power. For example, if each LED in a non-multiplexed 320 by 240 pixel display is driven with 40 ma of current at a typical voltage drop of 2.5 volts, each LED dissipates 0.1 watts, for a total array dissipation of nearly 23 kw with all LEDs on. Typical display dissipation with average image content is significantly less, but if linear drivers are used to control the current and brightness of each LED, many kilowatts of power, split between the LEDs and the drivers, may still be dissipated.

Yet another application of red, green, and blue LEDs is in sequential lighting for video projection. Some video projection systems, such as those using an array of micro mirrors, generate a color image by sequentially illuminating the mirror array with red, green and blue light. Current practice is to use a color wheel having red, green and blue filters between a white projection lamp and the mirror array, rapidly spinning the color wheel in synchronization with display of red, green and blue portions of the image on the mirror array. For some applications such as micro projection displays to be used in cell phones and other small electronic devices, LEDs are a more efficient light source. By utilizing sequentially switched red, green, blue LEDs, the color wheel and its associated mechanical complexity may be eliminated.

A more efficient switch-mode driver is therefore desirable, which has lower dissipation in the driver at all LED brightness levels, and which is better suited to sequential lighting of LEDs.

SUMMARY OF THE INVENTION

The invention provides a method and apparatus for efficiently and individually controlling the current flow through each LED in a series connected string of LEDs.

In an embodiment of the invention described in greater detail below, a current source generates, with high efficiency, a current that is substantially constant over a wide range of output voltages. This current is injected into the first end of a series-connected string (hereinafter referred to as string) of LEDs, with the second end of the string connected through a resistor to ground. The voltage developed across the resistor, which is a measure of current flow in the series string, is fed back to the current source, wherein feedback closely controls the amount of current flow. The current source is designed to provide this substantially constant current over an output voltage range from near zero to at least the summed forward voltage drops of all "on" LEDs in the string.

A switch having a high off resistance and low on resistance, such as a field effect transistor (FET), is placed in parallel with each LED in the string. A level shifting driver couples a logic signal to the control terminal of each such switch. When the switch across a particular LED is closed responsive to the control signal applied to the level shifting driver, substantially all the current flows through the switch rather than the LED, and little or no light is emitted. Because the on resistance of the switch is very low, the power dissipated in the switch (current squared times resistance) is also very low. With the switch turned on, the forward voltage drop of the LED it is controlling drops to near zero, since little current is flowing through the LED. However, because the current source is designed to provide constant current over a wide range of output voltages, the current flow through those other LEDs which are on changes very little. When the switch is turned off, it presents a high resistance in parallel with the LED, so substantially all the string current flows through the LED, creating a high brightness level.

By modulating the duty cycle of each switch, the brightness of each associated LED may be varied smoothly over its full range. If the string of LEDs includes primary color (red, green, blue or RGB) LEDs in close proximity, a wide range of mixed light color may thus be generated. If the series string contains, for example, a plurality of white LEDs as in an architectural lamp, the overall brightness of the lamp may be controlled with high efficiency by controlling the number of LED's in the "on" state.

Another embodiment of the invention uses a switch to control a group of LEDs rather than a single LED in the string. For example, it may be desirable to increase the brightness of each color in a RGB LED light by employing multiple red, multiple green, and multiple blue LEDs, all in series connection. A single switch across each group of red, green and blue LEDs allows wide ranging control of brightness of that color group, while minimizing the number of drivers.

Yet another embodiment of the invention sequentially switches LEDs, individually or in groups, so as to allow a single current source with maximum output voltage of Vmax to drive a series string of LEDs having a combined forward voltage drop greater than Vmax, by insuring that enough LEDs are bypassed by a low resistance switch to keep the combined forward voltage drop of the illuminated LEDs below Vmax.

A significant advantage of the described embodiments is therefore the reduction in LED driver complexity, and the efficiency of modulating the brightness of a plurality of LEDs leading to reduced power dissipation and heating in a light or display.

Further benefits and advantages will become apparent to those skilled in the art to which the invention relates.

DESCRIPTION OF THE VIEWS OF THE DRAWINGS

Throughout the drawings, like elements are referred to by like numerals.

DETAILED DESCRIPTION

Figure 1:
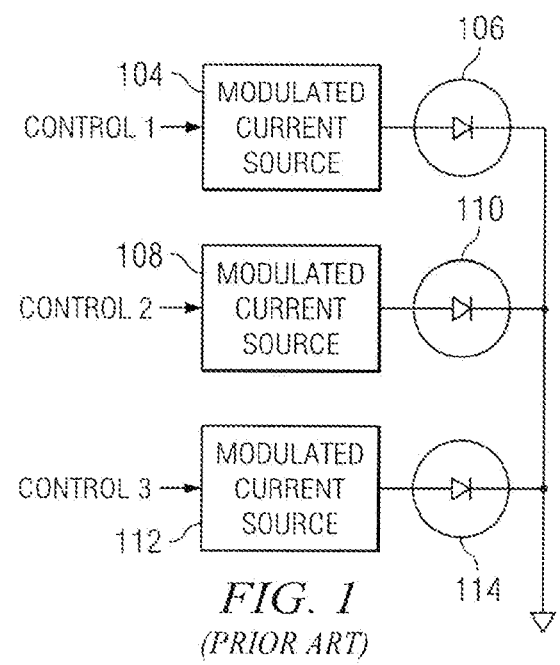
FIG. 1 (prior art) shows an LED controller using a plurality of current sources to control the relative brightness of a plurality of LEDs.

In FIG. 1 (prior art), a plurality of LEDs 106, 110, 114 each are driven by a MODULATED CURRENT SOURCE 104, 108, 112 respectively. A first terminal of MODULATED CURRENT SOURCE 104 is coupled to a first terminal of LED 106. A second terminal of LED 106 is coupled to ground. A first CONTROL 1 signal is coupled to a second terminal of MODULATED CURRENT SOURCE 104. In a similar fashion, a first terminal of MODULATED CURRENT SOURCE 108 is coupled to a first terminal of LED 110. A second terminal of LED 110 is coupled to ground. A second CONTROL 2 signal is coupled to a second terminal of MODULATED CURRENT SOURCE 108. A first terminal of MODULATED CURRENT SOURCE 112 is coupled to a first terminal of LED 114. A second terminal of LED 114 is coupled to ground. A third CONTROL 3 signal is coupled to a second terminal of MODULATED CURRENT SOURCE 112.

In operation, current from MODULATED CURRENT SOURCE 104 flows through LED 106 and then to ground, causing LED 106 to generate light with intensity substantially proportional to the amount of current flow. A logic signal CONTROL 1 is coupled to the control input of MODULATED CURRENT SOURCE 104. The full current generated by MODULATED CURRENT SOURCE 104 is output to the LED 106 when the CONTROL 1 is "on", and little or no current is output to the LED 106 when the CONTROL 1 is "off". By modulating the duty cycle of CONTROL 1, the average current is varied between minimum and maximum, causing the intensity of the LED 106 to vary correspondingly between off and full brightness.

In a similar manner, the brightness of the other LEDs 110, 114 are varied responsive to the associated CONTROL signals. If LEDs 106, 110, and 114 are red, green, and blue respectively, the color and intensity of the resulting mixture of light is therefore controlled by the CONTROL signals.

Figure 2:
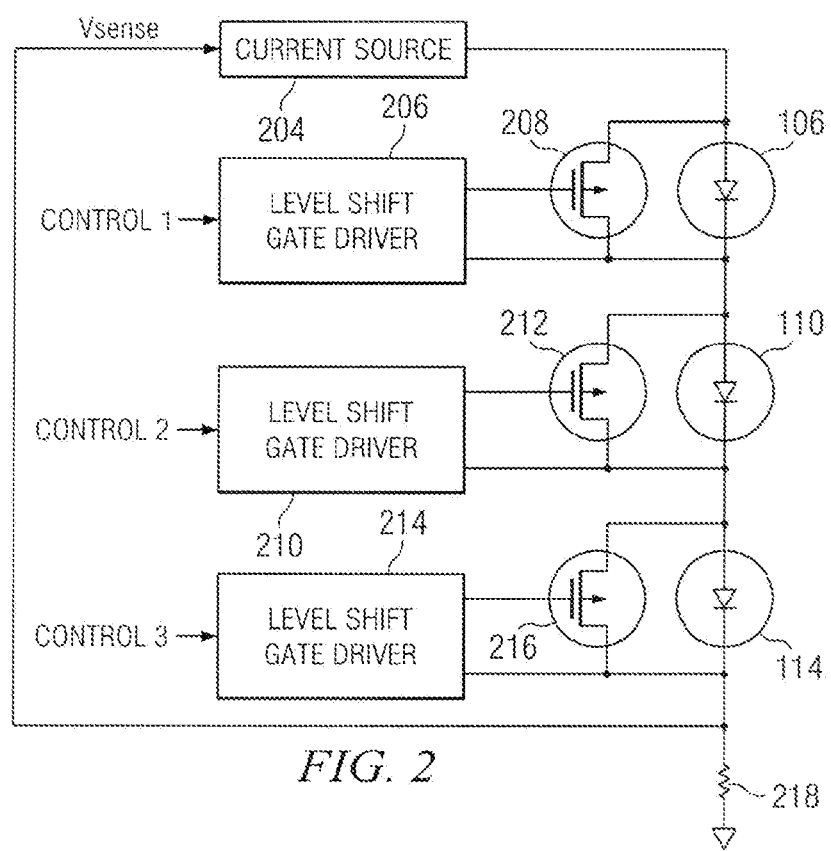
FIG. 2 shows an LED controller using a single current sources and a plurality of field effect transistor (FET) switches, each FET in parallel with a single LED in a series string.

In FIG. 2, a CURRENT SOURCE 204 has a first terminal coupled to a series string of LEDs 106, 110, 114. The first terminal of CURRENT SOURCE 204 is coupled to a first terminal of LED 106; a second terminal of LED 106 is coupled to a first terminal of LED 110; a second terminal of LED 110 is coupled to a first terminal of LED 114; a second terminal of LED 114 is coupled to a first terminal of resistor 218; a second terminal of resistor 218 is coupled to ground.

A LEVEL SHIFT GATE DRIVER 206 has a first terminal coupled to a CONTROL 1 signal, a second terminal coupled to the gate of a field effect transistor (FET) 208, and a third terminal coupled to the source of FET 208 and to the second terminal of LED 106. The drain of FET 208 is coupled to the first terminal of LED 106. In similar configuration, a LEVEL SHIFT GATE DRIVER 210 has a first terminal coupled to a CONTROL 2 signal, a second terminal coupled to the gate of FET 212, and a third terminal coupled to the source of FET 212 and to the second terminal of LED 110. The drain of FET 212 is coupled to the first terminal of LED 110. A LEVEL SHIFT GATE DRIVER 214 has a first terminal coupled to a CONTROL 3 signal, a second terminal coupled to the gate of FET 216, and a third terminal coupled to the source of FET 216 and to the second terminal of LED 114. The drain of FET 216 is coupled to the first terminal of LED 114. The first terminal of resistor 218 is coupled to a second terminal Vsense of CURRENT SOURCE 204.

In operation, CURRENT SOURCE 204 uses a feedback loop to modify the current flowing from its output first terminal in response to the voltage developed across resistor 218, which is coupled to the second terminal Vsense of CURRENT SOURCE 204. At the desired current flow through the series string of LEDs and resistor 218, a specific voltage is present across resistor 218 and hence at Vsense. As the current deviates above the desired value, the Vsense voltage also increases, causing CURRENT SOURCE 204 to act to decrease current; as current deviates below the desired value, Vsense decreases, causing CURRENT SOURCE 204 to act to increase current. As the combined voltage drop of the series string changes, this feedback action rapidly adjusts CURRENT SOURCE 204 to maintain the desired substantially constant current.

When it is desired that all LEDs be on, the CONTROL signals are in a state (for example, a "low" logic state) which causes the LEVEL SHIFT GATE DRIVER to create a first gate to source voltage across each FET that puts that FET in a non-conducting, high-resistance state ("off"). Essentially no current then flows in any of the FETs, so is all flowing through the LEDs. An LED is turned off when the CONTROL signal corresponding to that LED is in a state (for example, a "high" logic state) which causes the LEVEL SHIFT GATE DRIVER to create a second gate to source voltage across the corresponding FET that puts it in a conducting, low-resistance drain to source state ("on"). Because the resistance of this "on" FET is much lower than the resistance of the LED it is parallel with, essentially all of the current flows through the FET, thus turning off the corresponding LED. Because the feedback mechanism in CURRENT SOURCE 204 responds to keep the current constant even as the FET turns on, the other LEDs in the string have little change in current flow or brightness. In this manner, the on or off state of each LED is controlled by its respective CONTROL signal, with little effect on the other LEDs.

In some applications, on or off control of a plurality of LEDs is sufficient, wherein each LED is either off or at its maximum brightness for the application. In this case, the CONTROL signals may be essentially static, changing state only when it is desired to turn an LED on or off. In other applications such as mixing light from red, green and blue LEDs to create a wide range of colors and brightness's, the CONTROL signals may change at a frequency high enough to avoid visible flicker of the LED output, and with a duty cycle ranging from low to high to create a corresponding brightness range from low to high.

Those skilled in the art will recognize that, while FIG. 2 shows three LEDs being driven by a single current source, the number of LEDs may be much larger, as long as the current source has a voltage output which is sufficient to overcome the combined forward voltage drop of the LEDs which are "on" at any given time. It will also be apparent that, in sequential illumination applications where not all LEDs are concurrently "on", the combined forward voltage drop of the total LED string may exceed the current source maximum voltage, as long as the combined forward voltage drop of the LEDs which are "on" is less than the current source maximum voltage. The LEVEL SHIFT GATE DRIVER 214 may also be eliminated or simplified, if the CONTROL 3 signal is ground referenced and the voltage drop across resistor 218 is small compared to the CONTROL 3 "high" logic level.

Figure 3:
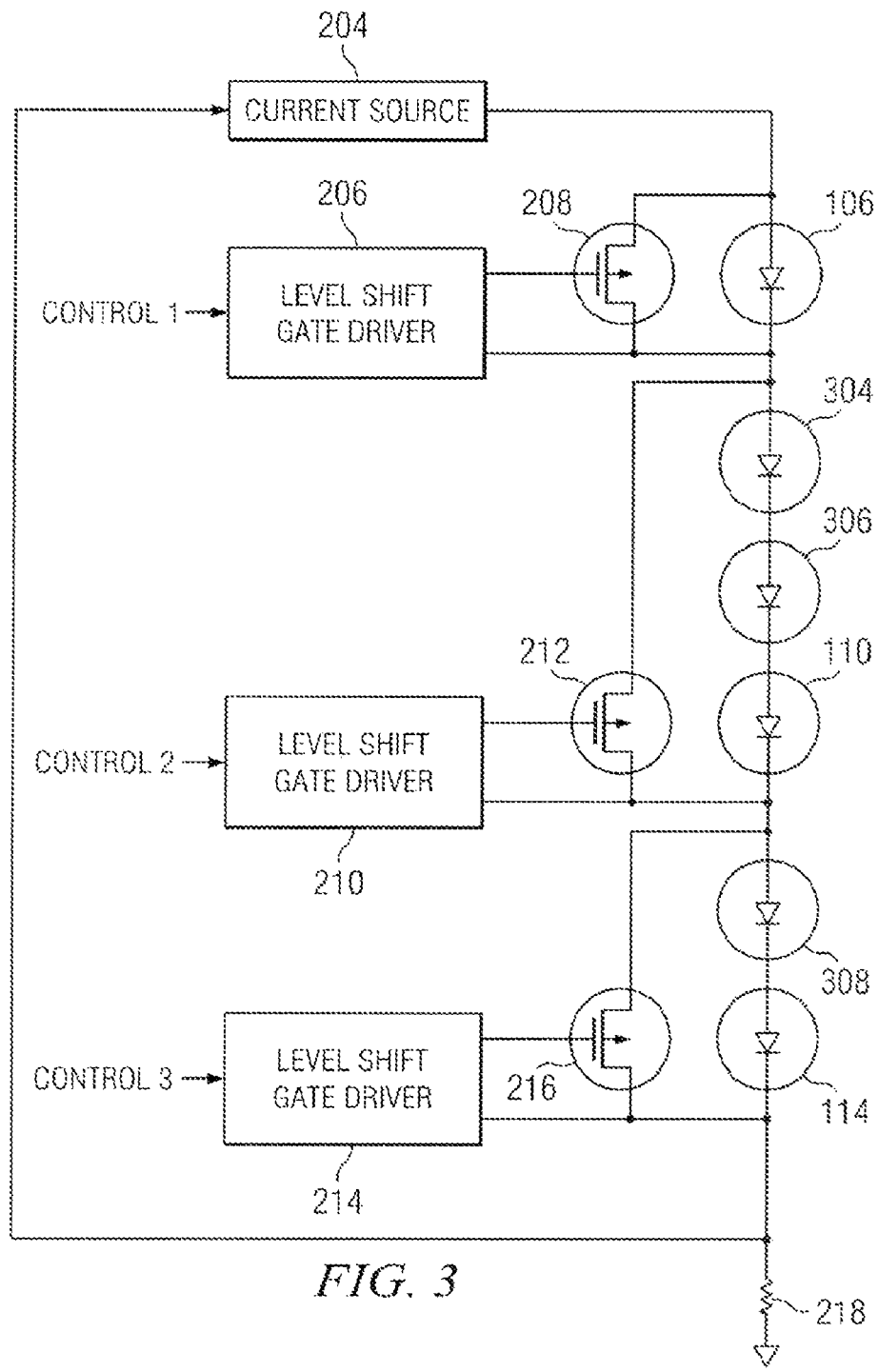
FIG. 3 shows an LED controller using a single current source and a plurality of field effect transistor (FET) switches, each FET in parallel with a group of one or more LEDs in a series string.

In FIG. 3, it is shown that each LEVEL SHIFT GATE DRIVER and FET may control the on/off state of more than one LED. Configuration of the system of FIG. 3 is the same as that of FIG. 2 with the exceptions that LED 110 is replaced with three contiguous (i.e., connected one to the next), series connected LEDs 304, 306 and 110, and LED 114 is replaced with a series string of two contiguous series connected LEDs 308 and 114. A CURRENT SOURCE 204 has a first terminal coupled to a series string of LEDs 106, 304, 306, 110, 308, and 114. The first terminal of CURRENT SOURCE 204 is coupled to a first terminal of LED 106; a second terminal of LED 106 is coupled to a first terminal of LED 304; a second terminal of LED 304 is coupled to a first terminal of LED 306; a second terminal of LED 306 is coupled to a first terminal of LED 110; a second terminal of LED 110 is coupled to a first terminal of LED 308; a second terminal of LED 308 is coupled to a first terminal of LED 114; a second terminal of LED 114 is coupled to a first terminal of resistor 218; a second terminal of resistor 218 is coupled to ground.

A LEVEL SHIFT GATE DRIVER 206 has a first terminal coupled to a CONTROL 1 signal, a second terminal coupled to the gate of a field effect transistor (FET) 208, and a third terminal coupled to the source of FET 208 and to the second terminal of LED 106. The drain of FET 208 is coupled to the first terminal of LED 106. In similar configuration, a LEVEL SHIFT GATE DRIVER 210 has a first terminal coupled to a CONTROL 2 signal, a second terminal coupled to the gate of FET 212, and a third terminal coupled to the source of FET 212 and to the second terminal of LED 110. The drain of FET 212 is coupled to the first terminal of LED 304. A LEVEL SHIFT GATE DRIVER 214 has a first terminal coupled to a CONTROL 3 signal, a second terminal coupled to the gate of FET 216, and a third terminal coupled to the source of FET 216 and to the second terminal of LED 114. The drain of FET 216 is coupled to the first terminal of LED 308. The first terminal of resistor 218 is coupled to a second terminal of CURRENT SOURCE 204.

The operation of the circuit of FIG. 3 is the same as FIG. 2, except that those FETs coupled to a plurality of LEDs, such as FET 212 coupled to the series string of LED 304, LED 306, and LED 110, control as a group that series connected group of LEDs. For example, when FET 212 is "off", responsive to the CONTROL 2 signal, LED 304, 306, and 110 all have the current from CURRENT SOURCE 204 flowing through them and thus are all on. When FET 212 is in the "on" state, it shunts current that otherwise would flow through LED 304, 306, and 110, and the LEDs are all off.

The control of multiple LEDs by each FET, as shown in FIG. 3, is an advantage in many applications, such as architectural lighting, where the increased light output of a plurality of LEDs is desired. For example, some architectural lighting creates a wide color range by mixing light from red, green and blue LEDs. By using the novel embodiment of FIG. 3, multiple red, multiple green and multiple blue LEDs may all be driven by a single current source, three level shift gate drivers, and three FETs, creating the desired brightness from multiple LEDs while retaining the simplicity of the embodiment shown.

Those skilled in the art will recognize that the example shown in FIG. 3 of one, two and three LEDs in groups is illustrative only, and that the number and types of LEDs in a group of LEDs controlled by a single switch may vary, as long as the voltage available from the CURRENT SOURCE 204 is high enough to overcome the forward voltage drop of the series string of LEDs. As described above, in an application using sequential illumination of LEDs, the combined forward voltage drop of the total LED string may exceed the current source maximum voltage, as long as the combined forward voltage drop of the LEDs which are "on" is less than the current source maximum voltage. The LEVEL SHIFT GATE DRIVER 214 may also be eliminated or simplified, if the CONTROL 3 signal is ground referenced and the voltage drop across resistor 218 is small compared to the CONTROL 3 "high" logic level.

Figure 4:
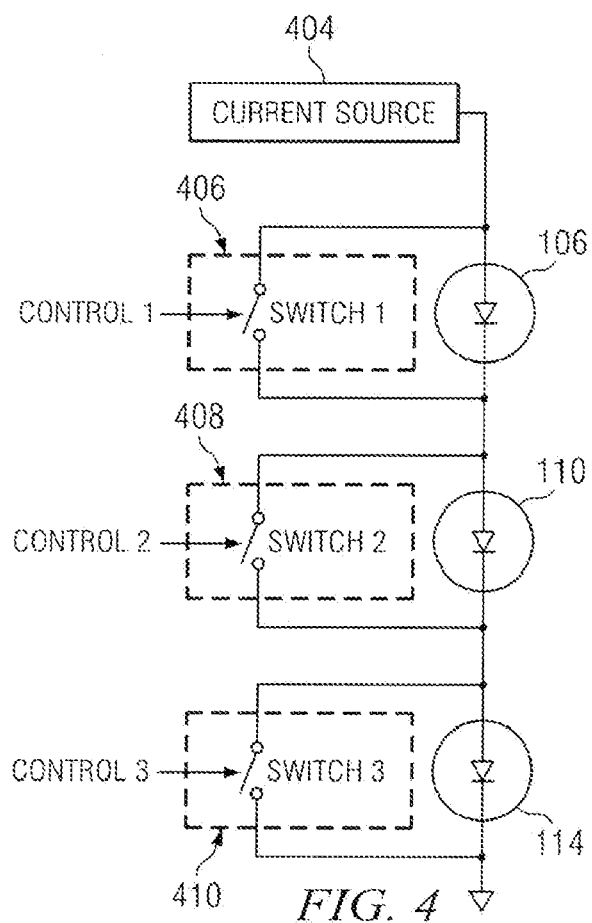
FIG. 4 shows an LED controller using a single current source and a plurality of controllable switches, each switch in parallel with a single LED in a series string FIG. 5 (prior art) shows a representative buck converter configured as a constant current source, as might be used in the embodiments described herein.

FIG. 4 is a block diagram of another embodiment of the invention. A current source 404 generates a substantially constant current, and has its output coupled to a first terminal of LED 106; a second terminal of LED 106 is coupled to a first terminal of LED 110; a second terminal of LED 110 is coupled to a first terminal of LED 114; a second terminal of LED 114 is coupled to ground. A SWITCH 406 has a first terminal coupled to the first terminal of LED 106, a second terminal coupled to the second terminal of LED 106, and a third terminal coupled to CONTROL 1 signal. A SWITCH 408 has a first terminal coupled to the first terminal of LED 110, a second terminal coupled to the second terminal of LED 110, and a third terminal coupled to CONTROL 2 signal. A SWITCH 410 has a first terminal coupled to the first terminal of LED 114, a second terminal coupled to the second terminal of LED 114, and a third terminal coupled to CONTROL 3 signal.

In operation, CURRENT SOURCE 404 creates a desired current flow through the series string of LEDs. When it is desired that all LEDs be on, the CONTROL signals are in a state (for example, a "low" logic state) which causes each SWITCH to enter a non-conducting, high-resistance state ("off"). Essentially no current then flows in any of the switches, so is all flowing through the LEDs. An LED is turned off when the CONTROL signal corresponding to that LED is in a state (for example, a "high" logic state) which causes the SWITCH to enter a conducting, low-resistance state ("on"). Because the resistance of this "on" SWITCH is much lower than the resistance of the LED it is in parallel with, essentially all of the current flows through the SWITCH, thus turning off the corresponding LED. Because the CURRENT SOURCE 404 provides a substantially constant current over a wide range of output voltages, the other LEDs in the string have little change in current flow or brightness. In this manner, the on or off state of each LED is controlled by its respective CONTROL signal, with little effect on the other LEDs.

Those skilled in the art will recognize that one or more switches may parallel and control one or more LEDs as described in FIG. 3, and that many types of controllable switches may be used. Varying the duty cycle of one or more switches will effectively modulate the brightness of the associated LED or LEDs. As noted above, sequential LED illumination allows a combined forward voltage drop exceeding the maximum output voltage of the current source.

Figure 5:
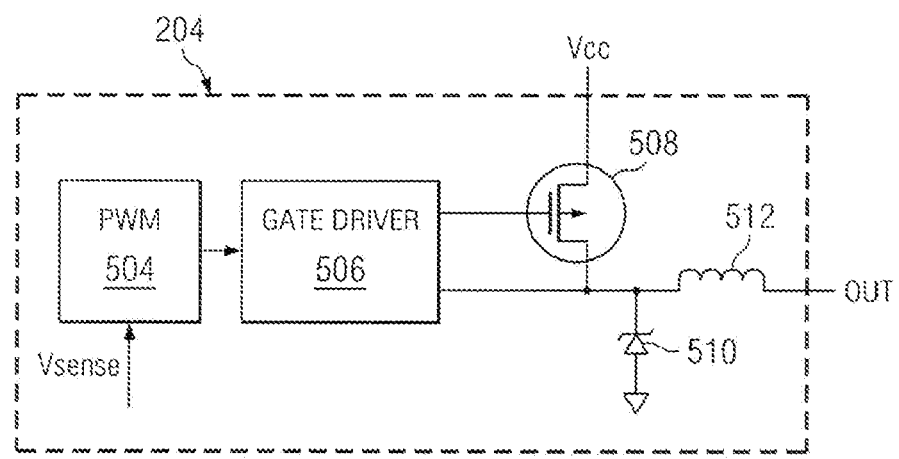

FIG. 5 (prior art) shows a representative dc to dc converter operating in a buck mode (converting a higher voltage to a lower voltage), and further configured to create a constant current rather than a constant voltage. Current source 204 comprises pulse width modulator PWM 504, having a second terminal Vsense coupled as described above to a resistor with one terminal grounded, whose voltage drop is proportional to current flow from CURRENT SOURCE 204. A first terminal PWM or PWM 504 is coupled to a first terminal of gate driver 506. A second terminal of gate driver 506 is coupled to the gate of FET 508. A third terminal of gate driver 506 is coupled to the source of FET 508. The drain of FET 508 is coupled to a voltage supply Vcc. A first terminal of a diode 510 is coupled to the source of FET 508 and to a first terminal of inductor 512. A second terminal of diode 510 is coupled to ground. A second terminal of inductor 512 is coupled to the output terminal of CURRENT SOURCE 204 and then to the series string described above.

In operation, PWM 504 generates a periodic waveform which, acting through gate driver 506, causes FET 508 to turn on when the PWM terminal is in one state and off when in the other state. The duty cycle of the periodic waveform is responsive to the voltage at the Vsense terminal of PWM 504. When FET 508 is on, current flows from the supply Vcc through inductor 512 to the output load (series string described above), and diode 510 is reverse biased and non-conducting. When FET 508 is off, current flow continues due to the energy stored in inductor 512, and diode 510 becomes forward biased and conducting. The average current through inductor 512 (and hence to the load) is responsive to the duty cycle of FET 508, which as described is responsive to voltage Vsense. In this manner, the current output of CURRENT SOURCE 204 is automatically adjusted by the feedback action to maintain a nearly constant current out of CURRENT SOURCE 204.

Figure 6:
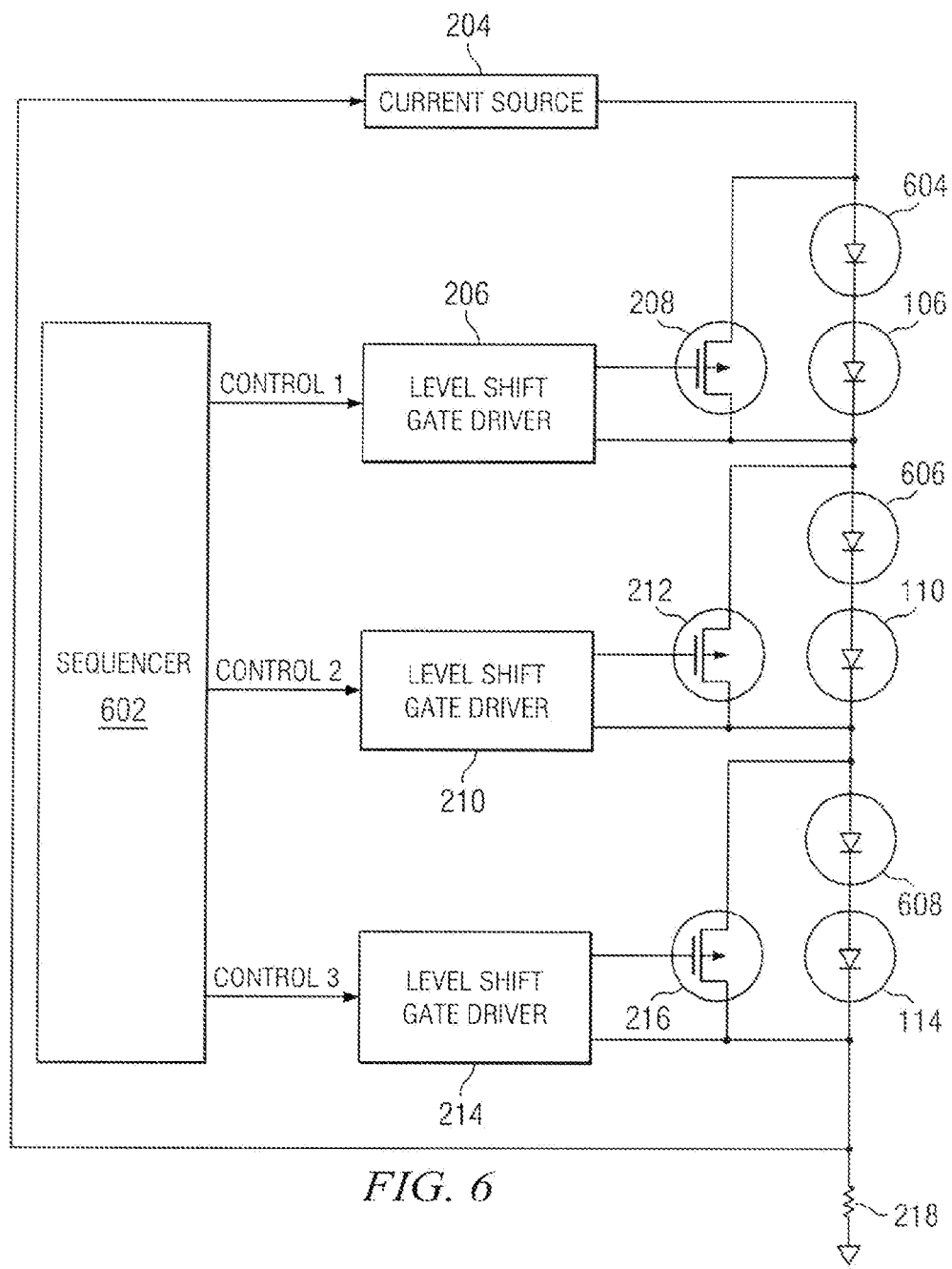
FIG. 6 shows an LED controller using a single current source and a plurality of field effect transistor (FET) switches, each FET in parallel with a group of one or more LEDs in a series string, and using a sequencer to sequentially allow current flow through LEDs.

In FIG. 6, A CURRENT SOURCE 204 has a first terminal coupled to a series string of LEDs 604, 106, 606, 110, 608, and 114. The first terminal of CURRENT SOURCE 204 is coupled to a first terminal of LED 604; a second terminal of LED 604 is coupled to a first terminal of LED 106; a second terminal of LED 106 is coupled to a first terminal of LED 606; a second terminal of LED 606 is coupled to a first terminal of LED 110; a second terminal of LED 110 is coupled to a first terminal of LED 608; a second terminal of LED 608 is coupled to a first terminal of LED 114; a second terminal of LED 114 is coupled to a first terminal of resistor 218; a second terminal of resistor 218 is coupled to ground.

A SEQUENCER 602 has first, second and third terminals. A LEVEL SHIFT GATE DRIVER 206 has a first terminal coupled to the first terminal of the SEQUENCER 602, a second terminal coupled to the gate of a field effect transistor (FET) 208, and a third terminal coupled to the source of FET 208 and to the second terminal of LED 106. The drain of FET 208 is coupled to the first terminal of LED 604. In similar configuration, a LEVEL SHIFT GATE DRIVER 210 has a first terminal coupled to the second terminal of the SEQUENCER 602, a second terminal coupled to the gate of FET 212, and a third terminal coupled to the source of FET 212 and to the second terminal of LED 110. The drain of FET 212 is coupled to the first terminal of LED 606. A LEVEL SHIFT GATE DRIVER 214 has a first terminal coupled to the third terminal of the SEQUENCER 602, a second terminal coupled to the gate of FET 216, and a third terminal coupled to the source of FET 216 and to the second terminal of LED 114. The drain of FET 216 is coupled to the first terminal of LED 608. The first terminal of resistor 218 is coupled to a second terminal of CURRENT SOURCE 204.

In operation, SEQUENCER 602 periodically and sequentially generates control signals which cause each LEVEL SHIFT GATE DRIVER to turn "on" its associated LEDs. The operation of the circuit of FIG. 6 is the same as FIG. 3, other than the generation of CONTROL1, CONTROL2 and CONTROL3 signals by the SEQUENCER 602. This sequencing limits the combined forward voltage drop to that of the LED or LED group having the highest combined forward voltage drop. This in turn keeps the combined forward voltage drop of the "on" LEDs below the maximum voltage available from the CURRENT SOURCE 204.

Those skilled in the art to which the invention relates will also appreciate that yet other substitutions and modifications can be made to the described embodiments, without departing from the spirit and scope of the invention as described by the claims below. For example, many variants of constant current source are known and will be suitable for this embodiment. The number of LEDs in the series string may vary widely, as may the number of LEDs grouped, as in FIG. 3, for control by a single FET. Alternative switches such as relays, triacs, or other physical or solid state switches may be used to shunt current around the LEDs. Many variations of level shift gate driver are known in the art, and many will be suited to the invention.

Many other alternatives to the circuits and sub circuits described are possible while retaining the scope and spirit of the invention.

What is claimed is:

1. An apparatus comprising:
   a current source having an output current level which is responsive to a control input;

a resistor that is coupled to ground and the control input of the current source;

a plurality of light emitting diodes (LEDs) that are coupled in series with one another between the current source and ground;

a plurality of field effect transistors (FETs), wherein each FET is coupled to the anode of at least one of the LEDs at its drain and the cathode of at least one of the LEDs at its source;

a plurality of level shift gate drivers, wherein each level shift gate driver is coupled to the gate and the source of at least one of the FETs, and wherein each level shift gate driver receives a control signal to actuate and deactuate its associated FET.

2. The apparatus of claim 1, wherein the apparatus further comprises a sequencer that is coupled to each of level shift gate drivers, wherein each FET is deactuated in sequence while the other FETs are actuated.

3. An apparatus comprising:
a current source that provides a substantially constant current and that has an output voltage limit;
a plurality of LEDs that are coupled in series with one another between the current source and ground;
a plurality of switches, wherein each switch is coupled in parallel to at least one LED so as to bypass the at least one LED when actuated;
a plurality of drivers, wherein each driver is coupled to the control electrode of at least one switch and the cathode of its associated LED; and
a controller that is coupled to each switch, wherein the controller actuates and deactuates each of the switches such that the combined forward voltage drop across unbypassed LEDs is less than the output voltage limit.

4. The apparatus of claim 3, wherein the apparatus further comprises a resistor that is coupled between the LEDs and ground.

5. The apparatus of claim 3, wherein the controller further comprises a sequencer that is coupled to each driver.

6. An apparatus comprising:
a current source that provides a substantially constant current and that has an output voltage limit;
a first LED that is coupled to the current source;
a second LED that is coupled to that is coupled to the first LED;
a third LED that is coupled to the second LED and ground;
a first transistor that is coupled in parallel to the first LED so as to bypass the first LED when actuated;
a second transistor that is coupled in parallel to the second LED so as to bypass the second LED when actuated;
a third transistor that is coupled in parallel to the third LED so as to bypass the third LED when actuated;
a first driver that is coupled to the control electrode of the first transistor and the cathode of the first LED;
a second driver that is coupled to the control electrode of the second transistor and the cathode of the second LED;
a third driver that is coupled to the control electrode of the third transistor and the cathode of the third LED;
a controller that is coupled to the first driver, the second driver, and the third driver, wherein the controller provides a control signal to each of the first, second, and third drivers to actuate and deactuate each of the first, second, and third transistors so that the combined forward voltage drop across unbypassed LEDs is less than the output voltage limit.

7. The apparatus of claim 6, wherein the apparatus further comprises a resistor that is coupled between the third LED and ground.

8. The apparatus of claim 6, wherein at least one of the first, second, and third LEDs further comprises a plurality of LEDs coupled in series with one another.

9. The apparatus of claim 6, wherein the controller further comprise a sequencer.

10. The apparatus of claim 6, wherein the first, second, and third transistors further comprise N-channel metal oxide semiconductor field effect transistor (MOSFETs).

* * * * *